US009547783B2

(12) United States Patent
Lewis et al.

(10) Patent No.: US 9,547,783 B2
(45) Date of Patent: Jan. 17, 2017

(54) TRACKING OBJECTS UTILIZING RFID TAGS

(71) Applicant: AT&T Mobility II LLC, Atlanta, GA (US)

(72) Inventors: John E. Lewis, Lawrenceville, GA (US); Justin McNamara, Dunwoody, GA (US); Fulvio Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 6 days.

(21) Appl. No.: 14/221,471

(22) Filed: Mar. 21, 2014

(65) Prior Publication Data

US 2014/0203917 A1 Jul. 24, 2014

Related U.S. Application Data

(63) Continuation of application No. 12/339,335, filed on Dec. 19, 2008.

(51) Int. Cl.
*G06K 7/10* (2006.01)
*G06K 7/00* (2006.01)
*H04M 1/725* (2006.01)

(52) U.S. Cl.
CPC ......... *G06K 7/10386* (2013.01); *G06K 7/0008* (2013.01); *H04M 1/7253* (2013.01)

(58) Field of Classification Search
CPC .............. G06K 19/0723; G06K 7/0008; G06K 19/0724; G06K 2017/0045; G06Q 10/087; G06Q 10/0833; H01Q 1/2216; H01Q 1/2225; H01Q 1/2208; H04B 5/0062; G07C 9/00111; G08B 21/0275; G08B 13/2462; G08B 21/22; G08B 21/24; G01S 5/0257; G01S 5/14

USPC ............... 340/8.1, 10.1, 10.51, 572.8, 568.1, 572.1,340/572.7; 455/41.1, 41.2, 404.1, 404.2, 456.1, 455/456.3, 414.1, 566, 410, 420

See application file for complete search history.

(56) References Cited

U.S. PATENT DOCUMENTS

| 5,966,656 | A  | * | 10/1999 | Elkin et al. .................. 455/421 |
| 6,774,811 | B2 |   | 8/2004 | Kaufman et al. |
| 7,248,167 | B2 |   | 7/2007 | Wassingbo |
| 7,323,988 | B2 |   | 1/2008 | Krstulich |
| 2005/0035862 | A1 | * | 2/2005 | Wildman et al. .......... 340/573.1 |

(Continued)

OTHER PUBLICATIONS

Reminding about Tagged Objects using Passive RFIDs; Tags to Banish Forgetfulness by Gaetano Borriello et al. (, Published 2004).*

(Continued)

*Primary Examiner* — Nalini Mummalaneni
(74) *Attorney, Agent, or Firm* — Baker & Hostetler LLP

(57) ABSTRACT

Radio frequency identification (RFID) tags may be affixed to one or more personal objects, such as a key, a watch, a wallet, a purse, a medicine container, or the like. A mobile telephone may be associated with the plurality of RFID tags. A display of the mobile telephone may indicate whether each of the RFID tags is in communication with an RFID reader. For example, the RFID reader may be embedded in a drawer lining, embedded in the mobile telephone itself, or embedded in a handheld wand. The mobile telephone may generate an alert when at least one of the plurality of RFID tags is not in communication with the RFID reader. For (Continued)

example, a trigger RFID may be affixed to a doorway. The trigger RFID may cause the mobile telephone to alert the user to a missing item.

17 Claims, 9 Drawing Sheets

(56) References Cited

U.S. PATENT DOCUMENTS

| | | |
|---|---|---|
| 2005/0285739 A1* | 12/2005 | Velhal et al. .............. 340/572.1 |
| 2006/0022801 A1* | 2/2006 | Husak et al. ................ 340/10.5 |
| 2006/0145850 A1* | 7/2006 | Krstulich ................... 340/572.1 |
| 2006/0148528 A1* | 7/2006 | Jung .................... G06Q 10/109 455/566 |
| 2008/0001746 A1 | 1/2008 | Childress et al. |
| 2008/0052202 A1 | 2/2008 | Bodin |
| 2008/0067244 A1 | 3/2008 | Marks |
| 2008/0106399 A1 | 5/2008 | Yaqub et al. |
| 2008/0197055 A1 | 8/2008 | Mallett |
| 2008/0197059 A1 | 8/2008 | Mallett |
| 2008/0278328 A1 | 11/2008 | Chand et al. |
| 2008/0284604 A1 | 11/2008 | Rubinstein |
| 2009/0153305 A1* | 6/2009 | Ambrosetti ................ 340/10.31 |

OTHER PUBLICATIONS

Borriello et al, "Reminding about Tagged Objects using Passive RFIDs", Published 2004.

* cited by examiner

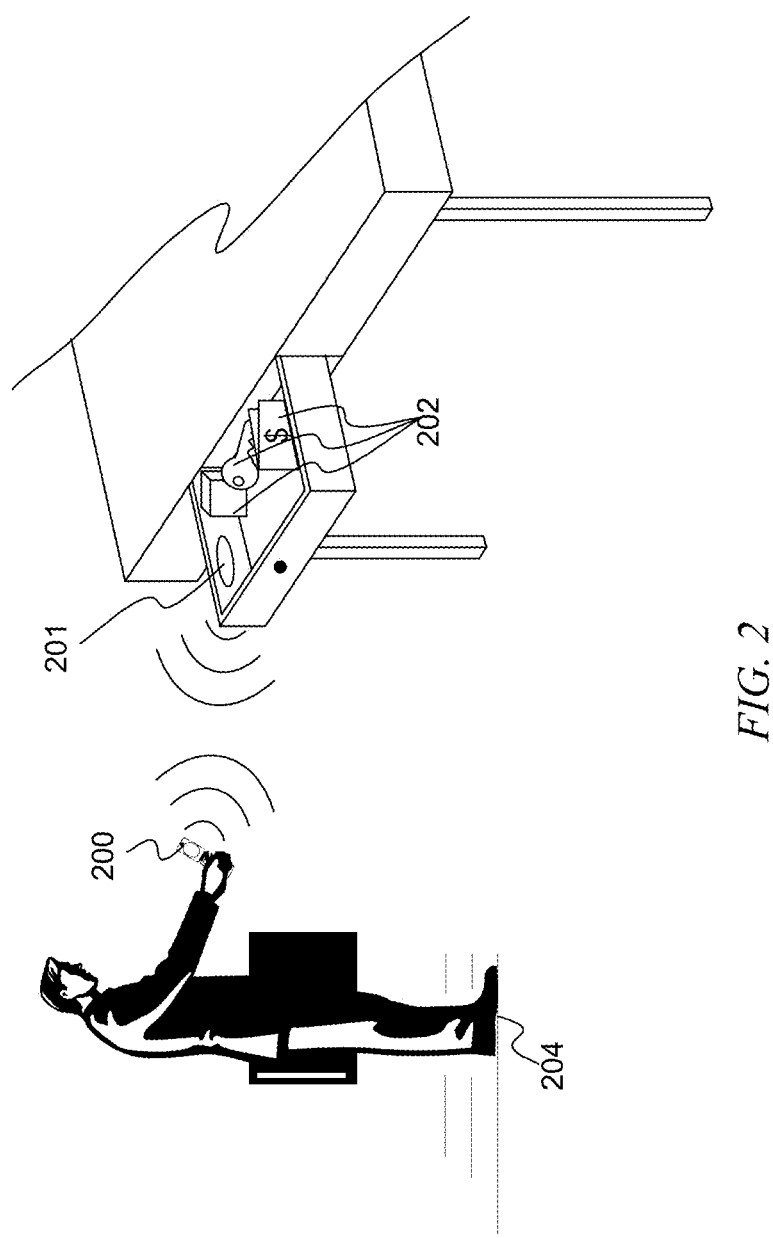

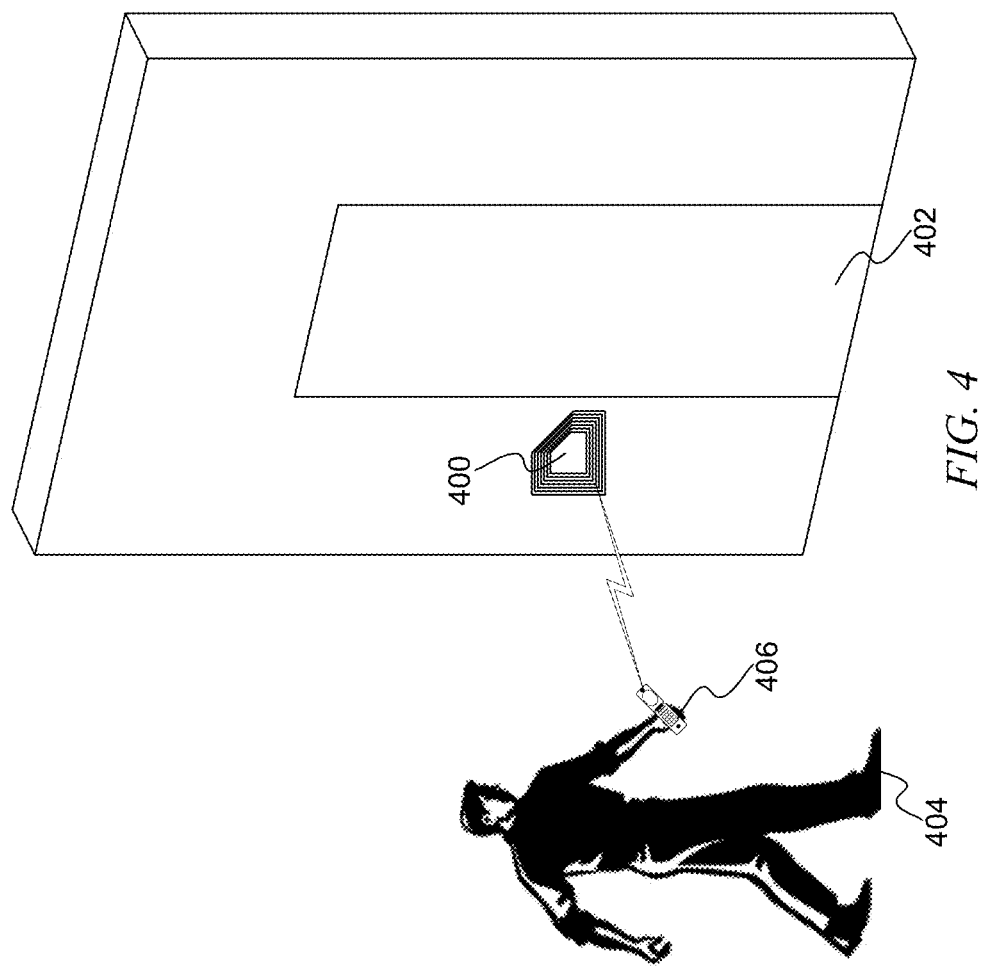

TRACKING OBJECTS UTILIZING RFID TAGS

CROSS REFERENCE TO RELATED APPLICATIONS

The instant application is a continuation of, and claims priority to, U.S. patent application Ser. No. 12/339,335 filed Dec. 19, 2008. U.S. patent application Ser. No. 12/339,335 is incorporated by reference herein in its entirety.

BACKGROUND

Every morning many people follow the same routine. A natural rhythm of daily life takes many of us from bed, to our work, and back again. As we depart in the morning, we almost always take the essentials, which for many include keys, wallet or purse, watch, and mobile telephone. In the evening, we deposit these same items, so that they'll be ready for service the next day.

Many people have a designated physical place for storing these items each night. This place may be a hallway table, a drawer near the kitchen, a shelf, a night stand, or the like. We lay them in this designated place each evening, so that, by rote, we know where they are in the morning. A pre-coffee grogginess notwithstanding, we know right where these essential items are. We take them with us out the door, and the natural rhythm of things continues.

However, a misplaced item disrupts our natural flow. Often when we're stressed, distracted, or preoccupied, we depart from our normal routine. For example, we might place our wallet on a coffee table rather than its usual place. The leather tri-fold may be subsequently covered up by a magazine, taken by a passing child as a toy, or hauled off to be chewed on by the family dog in a hiding place under a piece of furniture somewhere. The next morning, we collect the essentials from their normal place. In our rush, we might not even notice that our wallet is missing. We bolt out the door only to later realize that we have forgotten it. Alternatively, we might notice that it's missing before getting to the door, then spend a frustrating time going through bags and coat pockets and crawling about peering under couches and chairs, until we find it.

SUMMARY

The disclosed system tracks our belongings for us and alerts us when something is missing. When we do discover that something is missing the disclosed system helps us find it by tracking its last known location and correlating data about our activities.

The system may include a plurality of radio frequency identification (RFID) tags and a mobile telephone. The RFID tags may be affixed to one or more personal objects, such as a key, a watch, a wallet, a purse, a medicine container, or the like. The mobile telephone may be associated with the plurality of RFID tags. A display of the mobile telephone may indicate whether each of the RFID tags is in communication with an RFID reader.

The mobile telephone may generate an alert when at least one of the plurality of RFID tags is not in communication with the RFID reader. For example, a trigger RFID may be affixed to a doorway. The trigger RFID may cause the mobile telephone to alert the user to a missing item.

The mobile telephone may indicate the last time an RFID tag was scanned and may log that historic data. The historic data may be correlated to personal information management data, such as calendar data, to help aid in recovering a lost item. The mobile telephone may display an event from the personal information management data that is closest in time to the last time that the RFID tag was successfully scanned. This information may aid the user in recovering the lost item.

BRIEF DESCRIPTION OF THE DRAWINGS

FIG. 2 depicts an example radio frequency identification (RFID) reader in communication with RFID tags.

FIG. 4 depicts example communication with a trigger RFID tag.

DETAILED DESCRIPTION OF ILLUSTRATIVE EMBODIMENTS

Figure 1A:
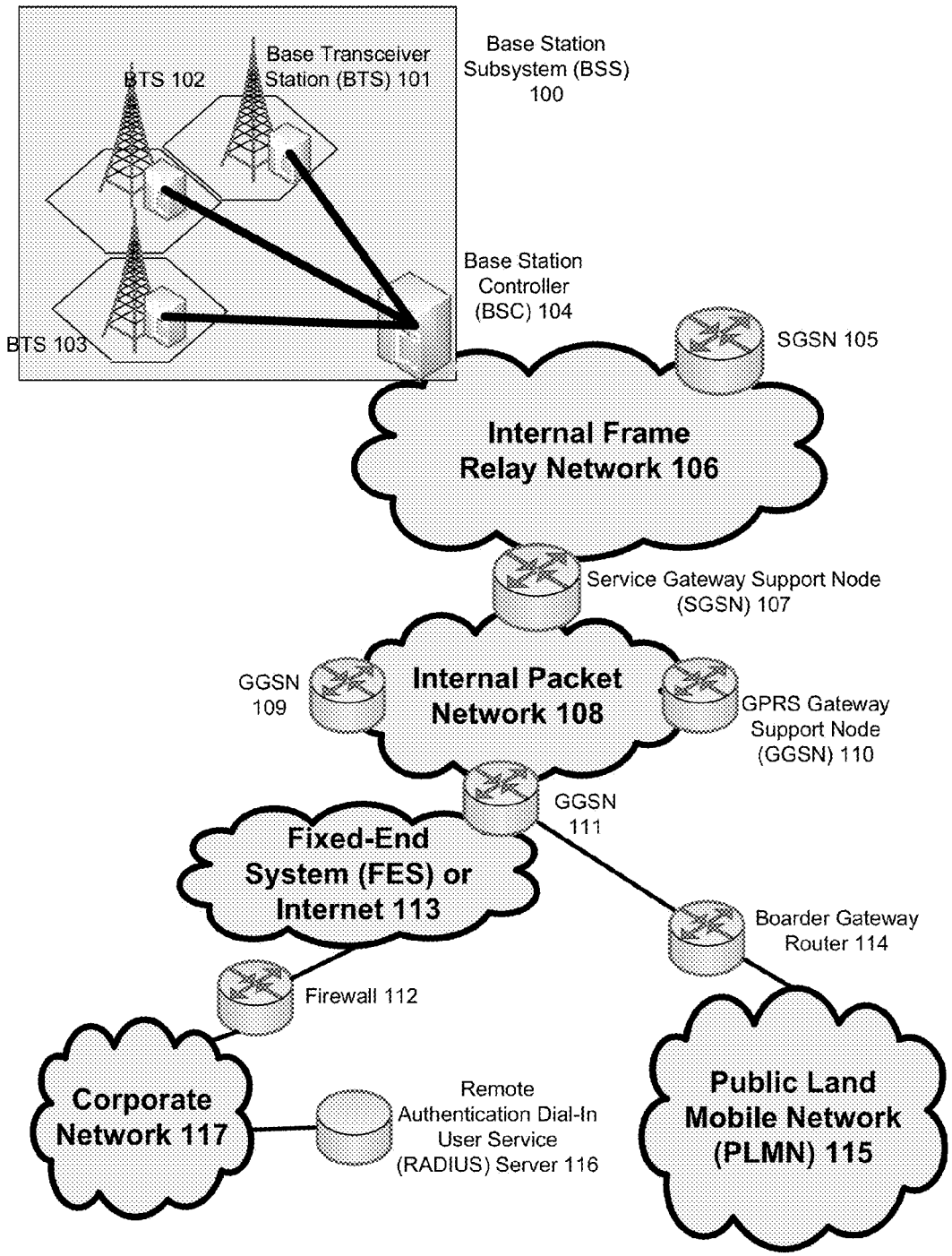
FIGS. 1A-C depict an example wireless network environment an example GPRS network architecture and an example GSM/GPRS/IP multimedia network architecture, respectively.
Figure 1B:
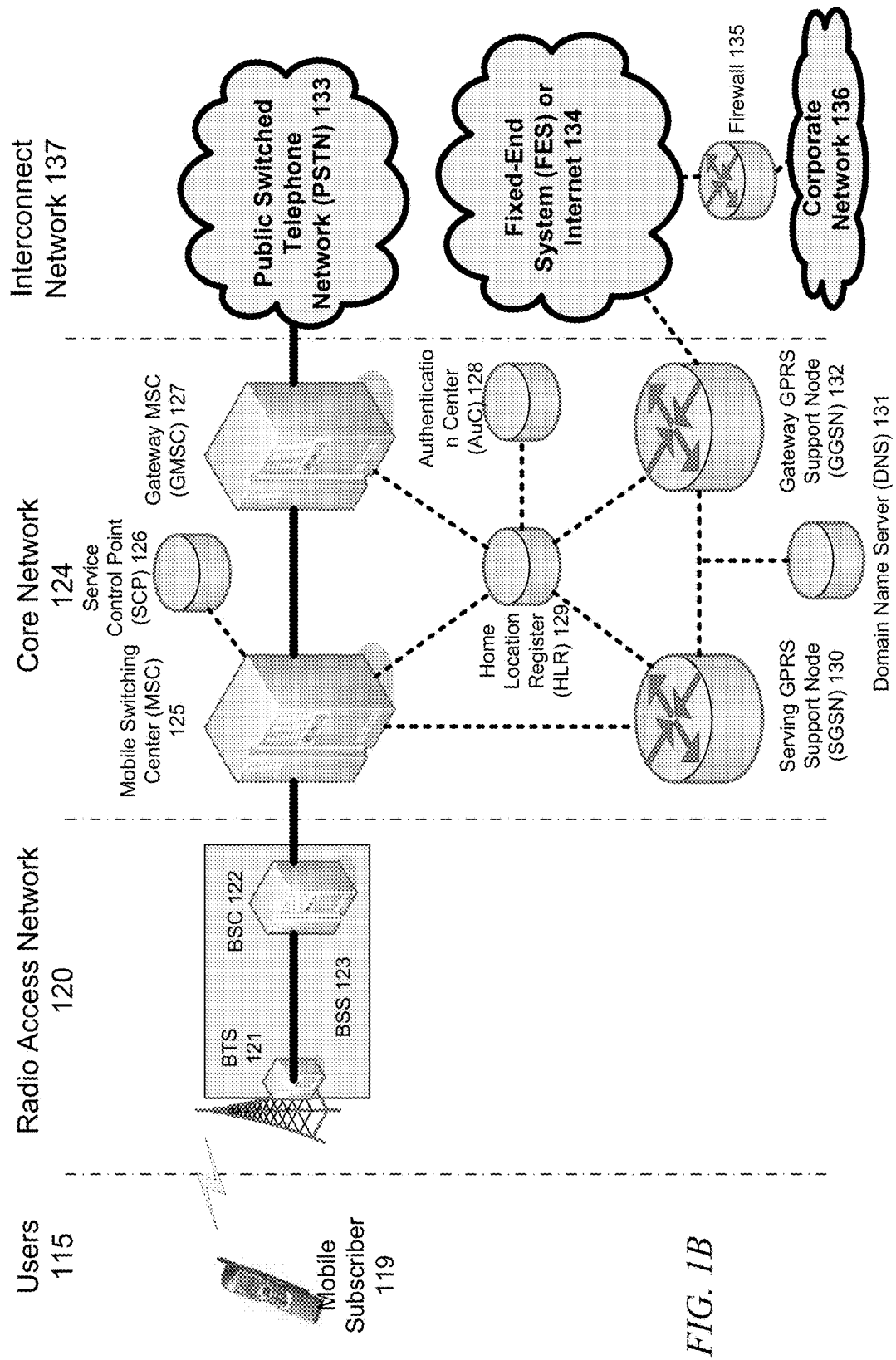
Figure 1C:
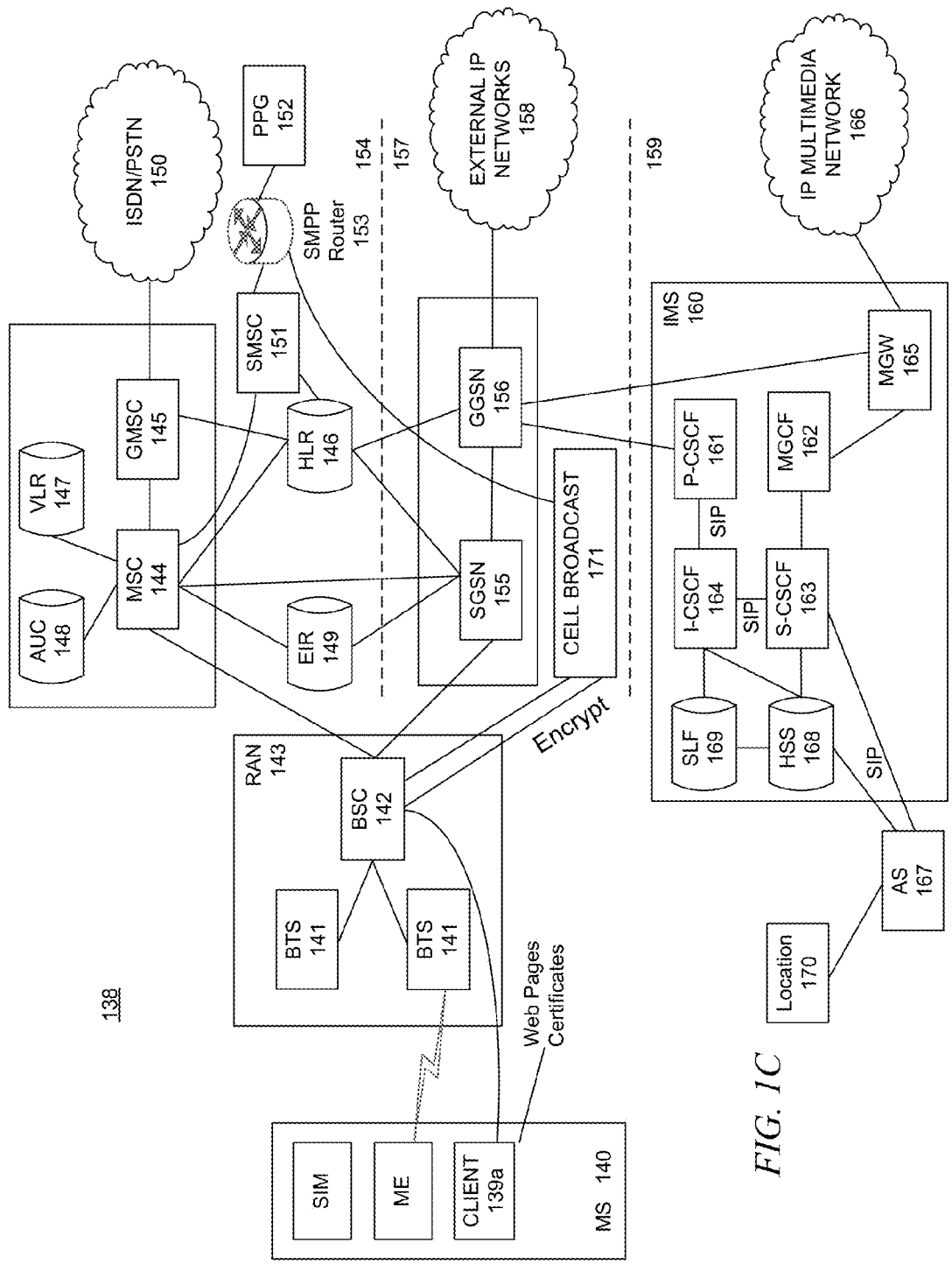

FIGS. 1A-C depict some example telephony radio networks and non-limiting operating environments in which a wireless security system may be used. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As maybe appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 ix Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, the BTSs 101, 102 and 103 may be the access points where users of packet-based mobile devices become connected to the wireless network. In an embodiment, the packet traffic originating from user devices is transported over the air interface to the BTS 103, and from the BTS 103 to the BSC 104. Base station subsystems, such as the BSS 100, may be a part of internal frame relay network 106 that may include Service GPRS Support Nodes ("SGSN") such as the SGSN 105 and 107. Each SGSN 105, 107, etc. may be in turn connected to an internal packet network 108 through which the SGSN 105, 107, etc. can route data packets to and from a plurality of gateway GPRS support nodes (GGSN) 222, 111, 110, etc.

As illustrated, the SGSN 107 and the GGSNs 222, 111 and 110 may be part of the internal packet network 108. Gateway GPRS serving nodes 222, 111 and 110 may provide an interface to external Internet Protocol ("IP") networks such as Public Land Mobile Network ("PLMN") 115, corporate intranets 117, Fixed-End System ("FES"), the public Internet 113 and/or the like. As illustrated, subscriber corporate network 117 may be connected to the GGSN 111 via a firewall 112; and the PLMN 115 may be connected to the GGSN 111 via a boarder gateway router 114. A Remote Authentication Dial-In User Service ("RADIUS") server 116 may be used for caller authentication when a user of a mobile cellular device calls corporate network 117, for example.

Generally, there maybe four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

FIG. 1B illustrates the architecture of a typical GPRS network as segmented into four areas: users 115, radio access network 120, core network 124 and interconnect network 137. The users area 115 may include a plurality of end users. The radio access network are 120 may include a plurality of base station subsystems such as the BSSs 123, which include BTSs 121 and BSCs 122. The core network are 124 may include a host of various network elements. As illustrated here, the core network 124 may include a Mobile Switching Center ("MSC") 125, a Service Control Point ("SCP") 126, a gateway MSC 127, a SGSN 130, a Home Location Register ("HLR") 129, an Authentication Center ("AuC") 128, a Domain Name Server ("DNS") 131 and a GGSN 132. The interconnect network area 137 also may include networks and network elements. As illustrated in FIG. 1B, the interconnect network are 137 may include a Public Switched Telephone Network ("PSTN") 133, a Fixed-End System ("FES") and/or the Internet 134, a firewall 135 and/or a Corporate Network 136.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives call traffic, for example, from the BSC 122, it may send a query to a database hosted by the SCP 126. The SCP 126 may process the request and may issue a response to the MSC 125 so that it may continue call processing as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns a mobile device, the mobile device goes through an attach process by which the mobile device attaches to a SGSN of the GPRS network. Referring now to FIG. 1B, mobile subscriber 119 may initiate the attach process by turning on the network capabilities of the mobile device. An attach request may be sent by the mobile subscriber 119 to the SGSN 130. The SGSN 130 may query another SGSN, to which the mobile subscriber 119 may have been attached before, for the identity of the mobile subscriber 119. Upon receiving the identity of the mobile subscriber 119 from the other SGSN, the SGSN 130 may request more information from the mobile subscriber 119. This information may be used to authenticate the mobile subscriber 119 to the SGSN 130 by the HLR 129. Once the mobile subscriber 119 is verified, the SGSN 130 may send a location update to the HLR 129 indicating the change of location to a new SGSN, in this case the SGSN at 130. The HLR 129 may notify the old SGSN, to which the mobile subscriber 119 was attached, to cancel the location process for the mobile subscriber 119. The HLR 129 may then notify the SGSN 130 that the location update has been performed. At this time, the SGSN 130 may send an "Attach Accept" message to the mobile subscriber 119, which in turn, may send an "Attach Complete" message to the SGSN 130.

After the attaching process, the mobile subscriber 119 may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the mobile subscriber 119. The mobile subscriber 119 may use an algorithm to send the user identification (ID) and/or a password to the SGSN 130. The SGSN 130 may use the same algorithm to compare the result. If a match occurs, the SGSN 130 may authenticate the mobile subscriber 119.

Next, the mobile subscriber 119 may establish a user session with the destination network, for example, the corporate network 136, by going through a Packet Data Protocol ("PDP") activation process. The mobile subscriber 119 may request access to the Access Point Name ("APN"), for example, UPS.com, and the SGSN 130 may receive the activation request from the mobile subscriber 119. The SGSN 130 may then initiate a Domain Name Service ("DNS") query to learn which GGSN node has access to the UPS.com APN. The DNS query may be sent to the DNS server 131 within the core network 124 which may be provisioned to map to one or more GGSN nodes in the core network 124. Based on the APN, the mapped GGSN 132 may access the requested corporate network 136. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the mobile subscriber 119.

Once activated, data packets of the call made by the mobile subscriber 119 may then go through radio access network 120, core network 124, and interconnect network 137, to reach corporate network 136.

FIG. 1C shows another example block diagram view of a GSM/GPRS/IP multimedia network architecture 138. As illustrated, the architecture 138 of FIG. 1C includes a GSM core network 154, a GPRS network 157 and/or an IP multimedia network 159. The GSM core network 154 may include a Mobile Station (MS) 140, at least one Base Transceiver Station (BTS) 141, and/or a Base Station Controller (BSC) 142. The MS 140 may be Mobile Equipment (ME), such as a mobile phone and/or a laptop computer 202c that is used by mobile subscribers, with a Subscriber identity Module (SIM). The SIM may include an International Mobile Subscriber Identity (IMSI), which may include a unique identifier of a subscriber. The BTS 141 may be physical equipment, such as a radio tower, that enables a radio interface to communicate with the MS 140. Each BTS may serve more than one MS 140. The BSC 142 may manage radio resources, including the BTS 141. The BSC 142 may be connected to several BTS 141. The BSC 142 and BTS 141 components, in combination, are generally referred to as a base station (BS) and/or a radio access network (RAN) 143.

The GSM core network 154 may include a Mobile Switching Center (MSC) 144, a Gateway Mobile Switching Center (GMSC) 145, a Home Location Register (HLR) 146, a Visitor Location Register (VLR) 147, an Authentication Center (AuC) 149, and an Equipment Identity Register (EIR) 148. The MSC 144 may perform a switching function for the network. The MSC may performs other functions, such as registration, authentication, location updating, handovers, and call routing. The GMSC 145 may provide a gateway between the GSM network and other networks, such as an Integrated Services Digital Network (ISDN) or a Public Switched Telephone Network (PSTN) 150. In other words, the GMSC 145 may provide interworking functionality with external networks.

The HLR 146 may include a database that contains administrative information regarding each subscriber registered in a corresponding GSM network. The HLR 146 may contain the current location of each mobile subscriber. The VLR 147 may include a database that contains selected administrative information from the HLR 146. The VLR may contain information necessary for call control and provision of subscribed services for each mobile subscriber currently located in a geographical area controlled by the VLR 147. The HLR 146 and the VLR 147, together with MSC 144, may provide call routing and roaming capabilities of the GSM network. The AuC 148 may provide parameters for authentication and/or encryption functions. Such parameters may allow verification of a subscriber's identity. The EIR 149 may store security-sensitive information about the mobile equipment.

The Short Message Service Center (SMSC) 151 may allow one-to-one Short Message Service (SMS) messages to be sent to/from the mobile subscriber 140. For example, the Push Proxy Gateway (PPG) 152 may be used to "push" (i.e., send without a synchronous request) content to mobile subscriber 102. The PPG 152 may act as a proxy between wired and wireless networks to facilitate pushing of data to MS 140. Short Message Peer to Peer (SMPP) protocol router 153 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 140 may first registers with the network to indicate its current location by performing a location update and IMSI attach procedure. MS 140 may send a location update including its current location information to the MSC/VLR, via the BTS 141 and the BSC 142. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 157 may be logically implemented on the GSM core network architecture by introducing two packet-switching network nodes, a serving GPRS support node (SGSN) 155 and a cell broadcast and a Gateway GPRS support node (GGSN) 156. The SGSN 155 may be at the same hierarchical level as the MSC 144 in the GSM network. The SGSN may control the connection between the GPRS network and the MS 140. The SGSN may also keep track of individual MS locations, security functions, and access controls.

The Cell Broadcast Center (CBC) 171 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 156 may provide a gateway between the GPRS network and a public packet network (PDN) or other IP networks 158. That is, the GGSN may provide interworking functionality with external networks, and may set up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time.

The GPRS network 157 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOW network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS may monitor pages for a circuit switched network while received data and vice versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 may be the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

The I-CSCF 164 may be an entrance to a home network, may hide the inner topology of the home network from other networks, and may provide flexibility for selecting an S-CSCF. The I-CSCF 164 may contact subscriber location function (SLF) 169 to determine which HSS 168 to use for the particular subscriber, if multiple HSSs 168 are present. The S-CSCF 163 may perform the session control services for the MS 140. This includes routing originating sessions to external networks and routing terminating sessions to visited networks. S-CSCF 163 may also decide whether application server (AS) 167 is required to receive information on an incoming SIP session request to ensure appropriate service handling. This decision may be based on information received from HSS 168 (or other sources, such as application server 167). The AS 167 also communicates to location server 170 (e.g., a Gateway Mobile Location Center (GMLC)) that provides a position (e.g., latitude/longitude coordinates) of the MS 140.

The HSS 168 may contain a subscriber profile and may keep track of which core network node is currently handling the subscriber. It may also support subscriber authentication and authorization functions (AAA). In networks with more than one HSS 168, a subscriber location function provides information on HSS 168 that contains the profile of a given subscriber.

The MGCF 162 may provide interworking functionality between SIP session control signaling from IMS 160 and ISUP/BICC call control signaling from the external GSTN networks (not shown). It also may control the media gateway (MGW) 165 that provides user-plane interworking functionality (e.g., converting between AMR- and PCM-coded voice). The MGW 165 may communicate with other IP multimedia networks 166.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the predefined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

FIG. 2 depicts an example radio frequency identification (RFID) reader 201 in communication with RFID tags and a mobile telephone 200. The mobile telephone may be a device that the user takes with him on a regular basis. In that sense, the mobile telephone may be a ubiquitous device always nearby or in use by the user. Each RFID tag may be fixed to a respective personal object 202. The personal objects 202 may include objects such as keys, wallets, watches, purses, medicine containers, and/or the like. The personal objects 202 may include objects that the user 204 handles or takes with him or her on a regular basis. These personal objects 202 may include things that the user wishes to know the location of on a regular basis.

The RFID reader 201 may include any device suitable for detecting and/or communicating with an RFID tag. The RFID reader 201 may be an external device (as illustrated in FIG. 2) or a device internal to the mobile telephone 200. The RFID reader 201 may operate in communication with the mobile telephone 200. The mobile telephone 200 may be associated with the plurality of RFID tags such that the display of the mobile telephone 200 indicates whether each of the RFID tags is in communication with the RFID reader 201 (i.e., whether each of the personal objects 202 are in physical proximity to the RFID reader 201). Accordingly, the user may know by viewing the display of the mobile telephone 200 whether the RFID tags are into communication with the RFID reader 201, and consequently that the personal objects 202 are present in the drawer, as shown in FIG. 2. The user 204 may determine whether the personal objects 202 are located in a typical spot where the items are typically left by viewing the display of the mobile telephone 200.

The RFID reader 201 may be external to the mobile telephone by being embedded in a drawer lining, on a shelf, in a container, or the like. To illustrate, if the user places his or her personal objects 202 in the same place in his or her house on a regular basis the RFID reader 201 may be disposed in proximity to that location. The RFID reader 201 may be in communication with a mobile telephone 200 or other handheld device. The RFID reader 201 may be embedded in a handheld wand. The handheld wand may be in wireless communication with the mobile telephone.

Where the RFID reader 201 is external to the mobile telephone 200 the RFID reader 201 may determine whether it is in communication with each of the RFID tags and may communicate information indicative of this connectivity to the mobile telephone 200. The mobile telephone 200 may display whether each of the RFID tags is in communication with the RFID reader 201. External RFID readers 201 may communicate with the mobile telephone 200 via a cordless protocol such as BLUETOOTH for example.

Where the RFID reader 201 is internal to the mobile telephone 200 the RFID reader 201 may communicate on a wired bus to a processor of the mobile telephone to indicate whether each of the RFID tags is in communication with the RFID reader 201.

The mobile telephone 200 may maintain a historical log of times and dates associated with RFID communication between the RFID reader 201 and the RFID tags which correspond to physical location of the user's personal objects 202. The historical log may provide a record of the location of these important personal objects 202. The historical log may be useful to the user if one of the personal objects 202 is misplaced and/or lost.

Figure 3A:
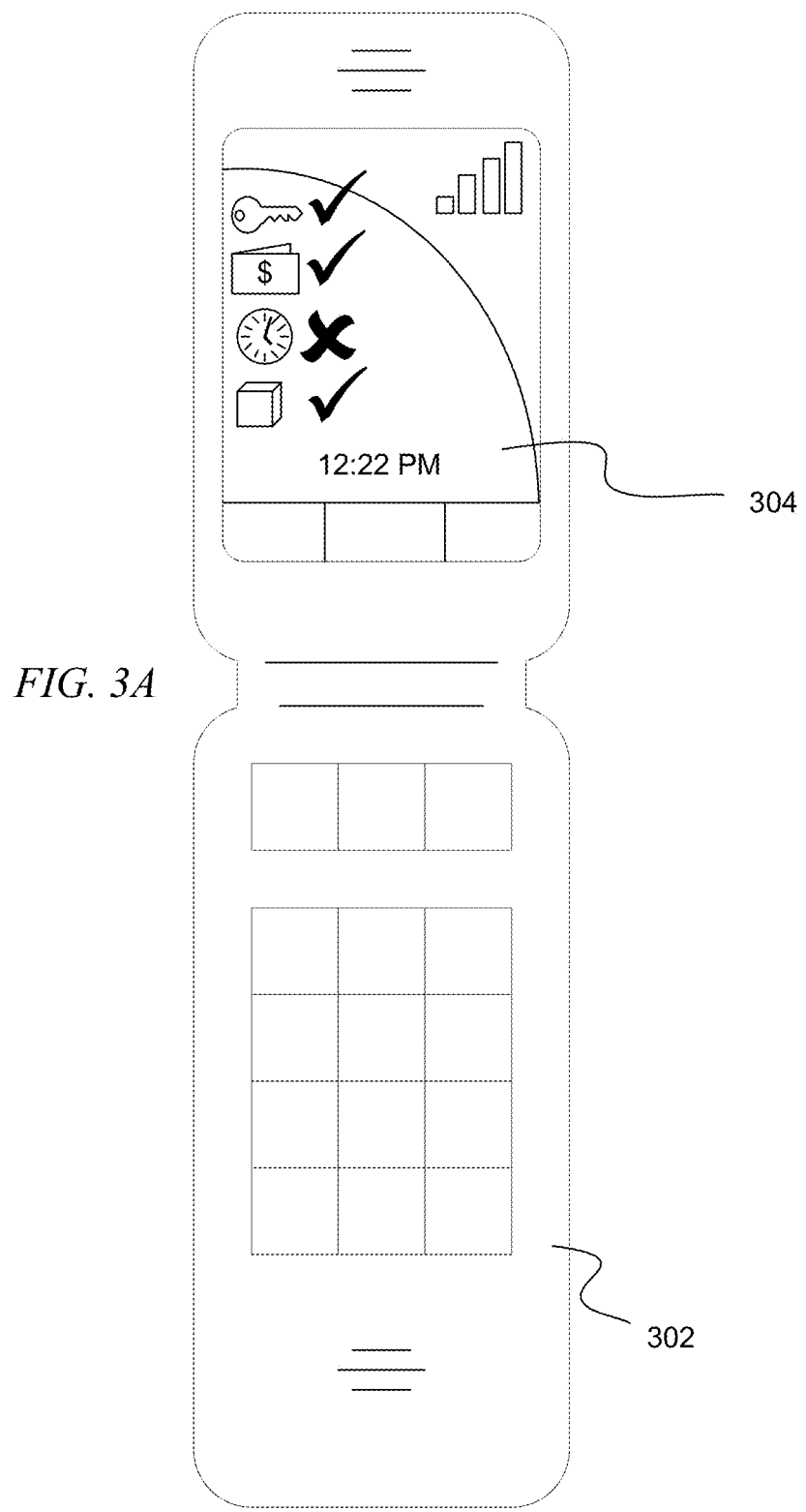
FIGS. 3A & B depict an example mobile telephone display, indicating communication with RFID tags and indicating a calendar event associated with a last known scan of a lost RFID tag, respectively.

FIG. 3A depicts an example mobile telephone display 304 that indicates communication with RFID tags. The mobile telephone 302 may include a display 304. The display 304 may include any hardware suitable for presenting information to a user. The display 304 may include an liquid crystal display (LCD) display, for example. The display 304 may be a touchscreen display, for example.

The display 304 may include iconic representations and/or textual representations of the RFID tags and their associated personal objects. As illustrated in FIG. 3A, the display 304 may include an icon of a key, wallet, watch, and miscellaneous object, for example. The display 304 may include a representation indicative of whether the RFID tag associated with an object is in communication with the RFID reader. For example, if the RFID tag associated with the personal object is in communication with the RFID, the display 304 may present a check mark. Likewise, if the RFID tag associated with the personal object is not in communication with the RFID reader, the display 304 may include an "x" mark. Thus, as illustrated in FIG. 3A, the display 304 indicates that all of the personal objects (i.e., the associated RFID tags) are in communication with the RFID reader except for the watch, as indicated by the iconic representation of a watch.

The mobile telephone 302 may alert the user when one of the personal objects is not in communication with the RFID reader. For example, the alert may include an audible tone, a visual indication, a kinesthetic buzzing or vibration indication, an e-mail message, a telephone call, and/or the like. Where the RFID reader is embedded in the mobile telephone 302, the user may be confident to know that the tagged personal objects are in proximity to the mobile telephone 302, and if one happens to be left behind or lost when the user is moving from one place to another, that the mobile telephone 302 will alert the user to the missing object. To illustrate, if the user leaves his watch on a table in a doctor's office and walks away, the mobile telephone 302 may alert the user to missing item.

Figure 3B:
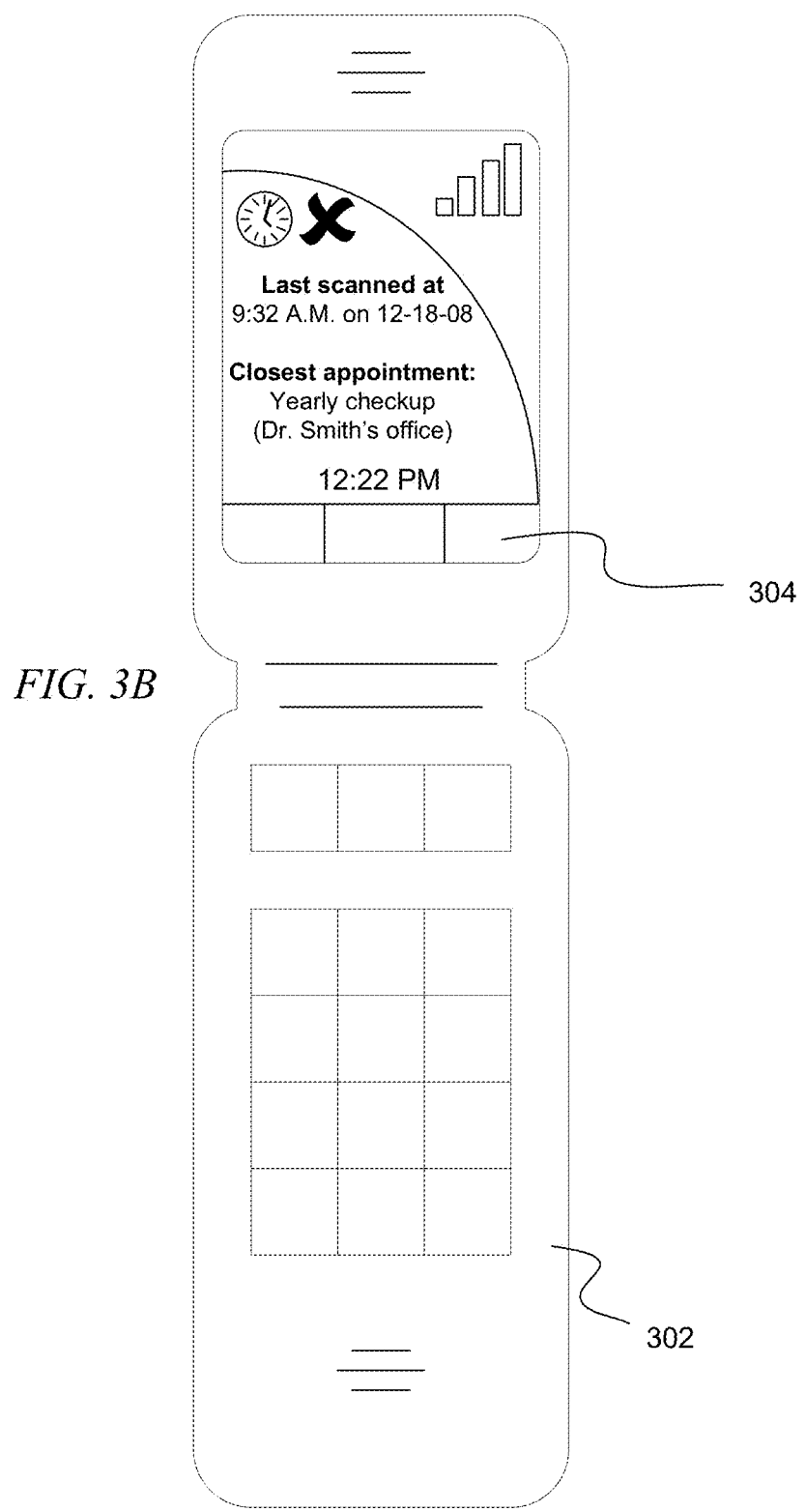

However, if the user does not notice the alert until sometime later. The system may correlate the last known scan of a lost RFID tag with information from the user's personal information management system, such as an digital calendar, for example. FIG. 3B depicts an example mobile telephone display 304 that indicates a calendar event associated with the last scan of a lost RFID tag.

The mobile telephone 302 logs historical data indicative of when each of the RFID tags is in communication with an RFID reader. Thus, the mobile telephone 302 may correlate this historical information with personal information management software module associated with the user. For example, the user may maintain an electronic calendar, task list, contact information, or the like associated with a personal information management software utility.

Where the user notices that the mobile display 304 indicates that his or her watch has not been in communication with the RFID reader, the user may request a correlation between the last known scan of the RFID tag associated with that personal object and the user's calendar information. Accordingly, the mobile telephone display 304 may indicate a time and/or date associated with a the last known scan of the RFID tag associated with that personal object. The mobile telephone display 304 may indicate a calendar appointment closest in time to the last known scan. The mobile telephone display 304 may indicate a most relevant calendar appointment. The process to determine a most relevant calendar item may include information from one or more other sources including the time of the last known scan. For example, global positioning system (GPS) information, location-based service information, e-commerce information, e-mail information, short message service (SMS) information, voice call information, and/or the like may be used to determine a most relevant calendar appointment. For example, a processing engine may correlate e-commerce information with a last known scan of an RFID tag associated with a wallet to determine a relevant calendar item.

The historical information of the RFID reader may be correlated with other information, such as location information, such that the mobile telephone display 304 may display a location associated with a last known scan.

To illustrate, the user may have recently attended a yearly checkup at the doctor's office. During the office visit, the user may have removed his or her watch and placed it on a counter in the exam room. Following the checkup, the user may have taken his or her mobile telephone 302 and other personal objects, but the user may have left the watch behind. Once the proximity between the watch and the mobile telephone 302 reaches the point at which the RFID reader (embedded in the mobile telephone 302 for example) is no longer in communication with the RFID tag associated with the watch, the mobile telephone may display an alert to the user.

However it is possible that the user does not notice the alert until later in the day. When the user notices the alert, the user may request a correlation between the last known scan and the calendar data. In response, the mobile telephone may display to the user the calendar appointment closest to the last known scan. In this example, the mobile telephone 302 would display the calendar appointment associated with the yearly checkup at Dr. Smith's office, as illustrated in FIG. 3B. This information may be suitable to jog the memory of the user such that the user remembers that he had removed his watch during the checkup. The user may determine that it is likely that he has left the watch behind at the doctor's office. Using this information, the user may be more likely to recover the lost item.

FIG. 4 depicts example communication with a trigger RFID tag 400. The disclosed system may include a trigger RFID tag 400. The trigger RFID tag 400 may cause the RFID reader to check for communication with the plurality of RFID tags associated with personal objects. The trigger RFID tag 400 may be associated with a drawer, a shelf, a doorway, a vehicle, a room, an office complex, another personal object, and/or the like. When the RFID reader is in proximity to the trigger RFID (i.e., the RFID reader is in communication with the trigger RFID tag 400), the RFID reader may then scan for communication with the plurality of RFID tags associated with personal objects.

To illustrate, a trigger RFID tag 400 may be associated with a doorway 402 of a house in the residence where the user 404 lives, as illustrated in FIG. 4. Thus, when the user 404 enters or exits the house, an event that occurs typically when the user is going someplace or returning home, the trigger RFID tag 400 may communicate with an RFID reader embedded in a mobile telephone 406 that the user is carrying. Once the RFID reader is in communication with the trigger RFID, the RFID reader may then indicate or determine whether it is in communication with other RFID tags.

The mobile telephone 406 may generate an alert if one of the personal objects is not in communication with the RFID reader when it is triggered by the trigger RFID tag 400. If the user accidentally leaves his wallet behind, the user 404 will not get much further than the door 402 of his or her house before the mobile telephone 406 indicates that the RFID tag associated with the wallet is not in communication with the RFID reader and that it is likely that the wallet was left behind. Thus, the user 404 may safely leave the house each morning knowing that if important personal objects have been left behind that the mobile telephone 406 will provide the user 404 with an indication that they are missing.

The use of a trigger RFID tag 400 may reduce the number of "false positive" alerts throughout the day, by targeting the alerts to geographic areas that are associated with key points during one's day. Similarly the trigger RFID tag 400 may be placed in a car or in an office building to trigger some RFID scans when the user 404 is in proximity to those places. The trigger RFID tag 400 may be placed at suitable checkpoints to determine whether or not the user 404 has all of the personal objects associated with the RFID tags.

Figure 5A:
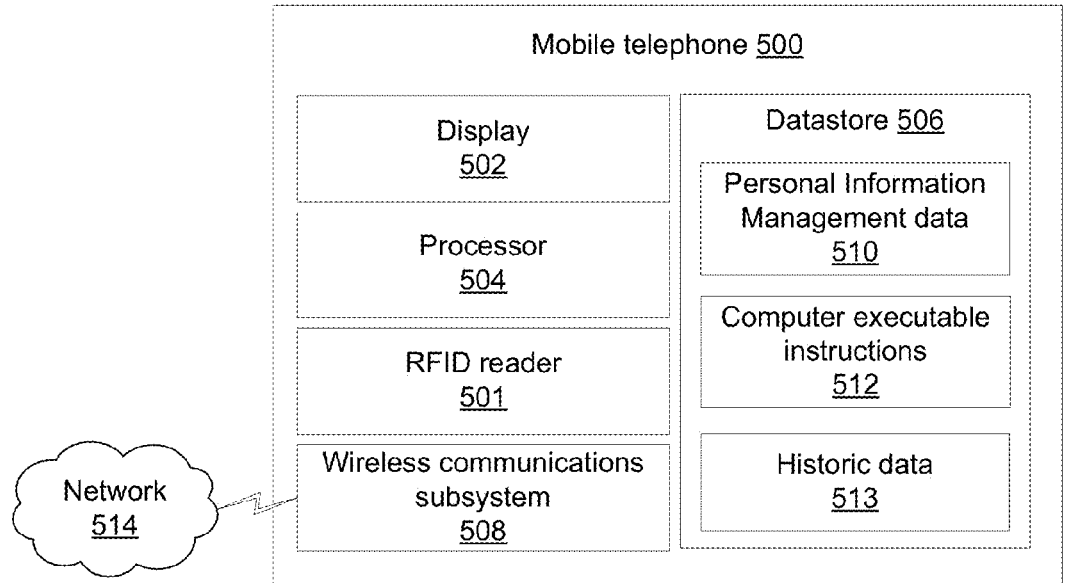
FIGS. 5A & B depict an example mobile telephone with an example RFID reader, internally embedded and externally in communication, respectively.
Figure 5B:
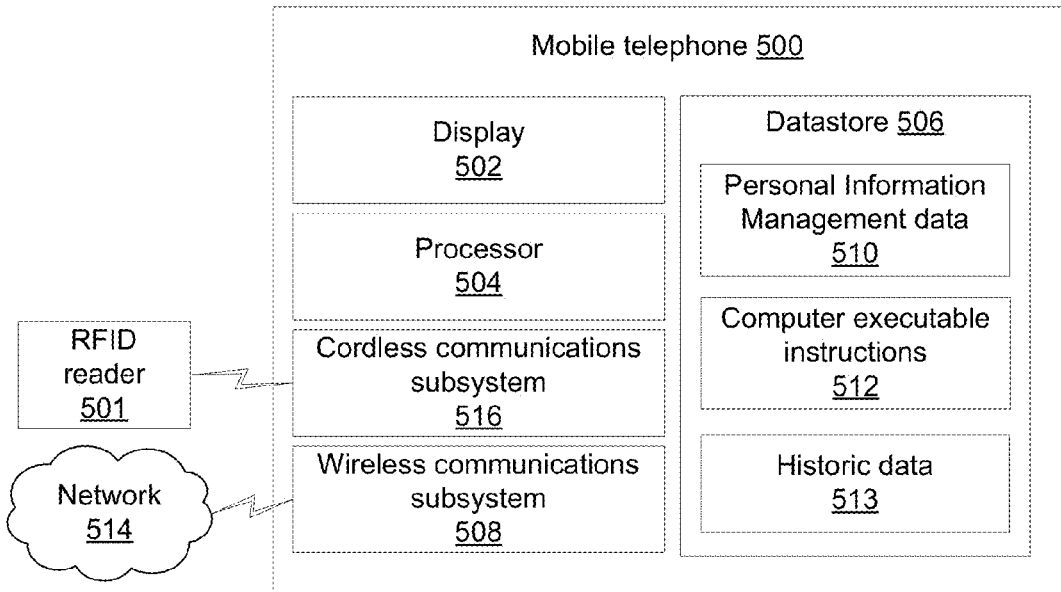

FIGS. 5A and 5B depict an example mobile telephone 500 with an example RFID reader 501 internally embedded and externally in communication, respectively. Mobile telephone 500, may include a display 502, a processor 504, a data store 506, and a wireless communications subsystem 508.

The display 502 may include any hardware suitable for displaying information to a user. For example, the display 502 may include a liquid crystal display (LCD), a touch-screen display, a light emitting diode (LED) display, or the like. The display 502 may include audible speakers for communicating audio information such as beep tones, voice recordings, or the like. The display 502 may be embedded in a mobile telephone. The display 502 may be in communication with the processor 504.

The processor 504 may include any device, component, system, or subsystem suitable for processing data. The processor 504 may include a microprocessor, a microcontroller, a field programmable gate array, digital logic, or the like. The processor 504 may be in communication with the display 502, the datastore 506, the wireless communications subsystem 508, and the like.

The processor 504 may be configured to receive an indication of whether a RFID tag is in communication with the RFID reader 501. The processor 504 may direct the display 502 to display a representation associated with an RFID tag and to change that representation in accordance with the indication from the RFID reader 501. For example, the processor 504 may direct the display to change a check mark to an "x" mark in accordance with an indication from the RFID reader 501 that a corresponding RFID tag is no longer in communication with the RFID reader 501. The processor 504 may associate a time with the indication from the RFID reader. The processor 504 may direct the datastore to store data indicative of the time and indication. The time may include a day-month-year and hour-minute-second indication. The time may include a code indicative of a specific time, such as an ISO 8601 format or other time/date format defined by ISO Technical Committee TC 154, for example. The processor 504 may store a log of transactions from the RFID reader 501; thus, the processor 504 may develop a time record of the presence or absence of personal objects associated with the RFID tags.

The datastore 506 may include any hardware suitable for storing data. For example, the datastore 506 may include volatile and/or nonvolatile memory. The datastore 506 may include random access memory, read only memory, magnetic storage memory, optical storage memory, compact flash storage memory, or the like. The datastore 506 may have stored therein personal information management data 510 and computer executable instructions 512.

The personal information management data 510 may include information associated with a personal information management software module. For example, the personal information management data 510 may include calendar data, task list information data, contact information data, and the like. The personal information management data 510 may include calendar entries. The calendar entries may include a date and a time range associated with the calendar entry. Each calendar entry may include a subject and location data fields. Each calendar entry may include notes and/or contact information associated with the calendar entry, for example.

The computer executable instructions 512 may include computer machine code, byte code, script language, or the like that when executed by the processor cause the processor to perform certain activities. For example, the computer executable instructions 512 when executed by the processor 504 may cause the processor 504 to perform the process illustrated by FIG. 6. The computer executable instructions 512 as stored on the datastore 506 may be downloadable as an application from the wireless network 514. The computer executable instructions 512 on the datastore 506 may be provided by a flash memory that is inserted into the mobile telephone 500.

The datastore may also include log data 513 that is indicative of when each of the RFID tags had been in communication with an RFID reader 501. For example, the log data 513 may include a time that the processor has associated with an indication of whether an RFID tag is in communication with the RFID reader 501. The log data may include a historic list of times associated with when each of a plurality of RFID tags is in communication with the RFID reader 501.

The datastore 506 may store a complete copy of the personal information management data 510 and historical log, or that data may be cached or digested. For example, the wireless network 514 may include a database such as the service control point 126 (see FIG. 1B) that stores a complete copy of that data. The processor 504 may retrieve the cached or digested version of that data and store that cached or digested version in the datastore 506 on an as needed basis.

The wireless communications subsystem 508 may include any hardware, software, or combination thereof suitable for providing wireless communications between the mobile telephone 500 and the wireless network 514. The wireless network 514 may be any network suitable for wireless data and/or voice communications, such the network environment shown in FIGS. 1A-C. For example, the wireless communications subsystem 508 may provide communications via a wireless telephone protocol such as GSM. The wireless communications subsystem 508 may provide wireless communications according to a wireless data protocols such as WiFi, for example.

The RFID reader 501 may be embedded in the mobile telephone 500, as shown in FIG. 5A. The RFID reader 501 may be external to the mobile telephone 500 and in communication with the mobile telephone 500 via a cordless communications subsystem 516, as shown in FIG. 5B. The cordless communications subsystem 516 may include any hardware, software, and combination thereof suitable for short-haul wireless communication. For example, the cordless communications subsystem 516 may implement a BLUETOOTH protocol stack and provide RF communications. The cordless communications subsystem 516 may be in communication with the processor 504.

The RFID reader 501 may include any device, component, system, or subsystem suitable for determining the presence and/or identity of an RFID tag. The RFID reader 501 may include a transceiver. The transceiver may send an RF signal. The RF signal may cause an electromagnetic challenge/response exchange with the RFID tag. The RFID reader 501 may generate a signal that provide powers for each RFID tag and that interrogates each RFID tag.

The RFID tag captures the energy it receives from the signal. The RFID tag may be separately powered. The RFID tag executes one or more commands sent by the RFID reader 501. For example, the RFID tag may send back a signal containing a unique digital ID identifying the RFID tag (and, in turn, the corresponding personal object). For example, the digital ID may include a 96 bit EPC-96 code. The RFID tag may include an antenna, a silicon chip, and a substrate or encapsulation material. The signal from the RFID reader and/or the RFID tag may include RF signals. For example, four common industrial, scientific, medical (ISM) frequency bands may be used: 128 kilohertz, 13.56 megahertz, 915 megahertz, and 2.45 gigahertz. The RFID reader and RFID tag communication link may define a physical range. For example, the system may use near-field range. The near-field range may include a range of up to approximately 10 meters.

Figure 6:
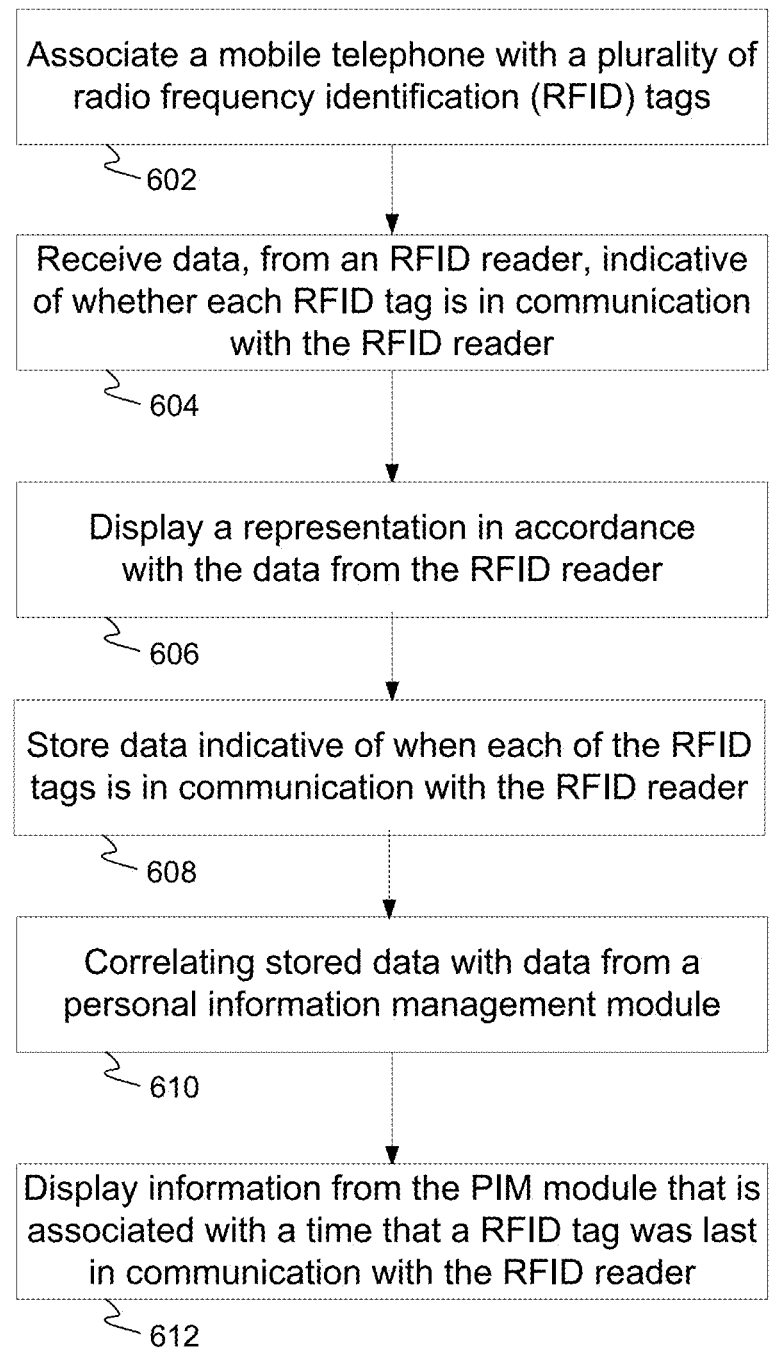
FIG. 6 depicts an example process for presenting information related to RFID tags.

FIG. 6 depicts an example process flow for reading information associated with a plurality of RFID tags. At 602, a mobile telephone may be associated with a plurality of frequency identification (RFID) tags. The mobile telephone may be associated with the plurality of RFID tags by a manufacturer configurable setting performed at the factory before the mobile telephone is released for sale. In an embodiment, the mobile telephone may include an application that enables a user to associate RFID tags with the mobile telephone. For example, the user may enter an RFID tag identification number into the display of the mobile telephone via the keypad. The user may indicate to the mobile telephone that the RFID tag is in proximity, and the RFID reader may scan for the RFID tag and associate that RFID tag with the mobile telephone.

Similarly, the user may identify or associate certain personal objects with the RFID tags associated with the mobile telephone. For example, the user may affix the RFID tags to personal objects such as a key, a watch, a wallet, a purse, a medicine container, or the like. The user may indicate to the mobile telephone which RFID tag is associated with which object. Accordingly, a display of the mobile telephone may indicate a textual or an iconic representation of the personal object in connection with the RFID tag.

At 604, data may be received from an RFID reader. The data may be indicative of whether each RFID tag is in communication with the RFID reader. The RFID reader may be a device external to a mobile telephone or it may be embedded in the mobile telephone itself. The RFID reader may scan the immediate proximity for RFID tags. The RFID reader may communicate to the mobile telephone which RFID tags have responded. Accordingly, the mobile telephone may identify which RFID tags (and in turn, which personal objects) are within the proximity of the RFID reader. The RFID reader if external to the mobile telephone may be embedded in a drawer lining, a shelf, a container, or the like. The RFID reader may include a separate wand.

At 606, a representation in accordance with the data received from the RFID reader may be displayed. For example, the representation may be displayed on a display of the mobile telephone. The display may include iconic and/or textual representations of whether each RFID tag is in communication with the RFID reader. For example the representation may include an affirmative checkmark and a negative "x" mark. The representation may include a visual and/or audible alert that sounds when one of the associated RFIDs are not in communication with the RFID reader.

The RFID reader may send data when triggered by being in communication with a trigger RFID. For example, the mobile telephone may indicate whether each of the other RFID tags (i.e., those associated with personal objects) may be in communication with the RFID reader when the RFID reader is triggered by being in communication with a trigger RFID. For example the trigger RFID may be associated with a drawer, a shelf, a doorway, a car, a room, or the like. When the RFID reader is in proximity to the trigger RFID, the RFID reader may cause the mobile telephone to indicate whether each of the other RFID tags are also in communication with the RFID reader. As a result, when a user is passing by the trigger RFID, the trigger RFID will cause the system to provide an indication indicating whether the personal objects are with the user.

To illustrate, an trigger RFID tag may be installed at a household main exterior doorway. This is a typical point that the user passes each morning when leaving for work. When the user passes through the doorway, the trigger RFID causes the system to check for the presence of the other RFID tags (i.e., and the corresponding personal objects). If the system discovers that one or more are missing, the system may alert the user. Because the user has not yet left the house, it is a convenient time for the user to be reminded about a missing personal item. For example, the user may have forgotten his wallet, and the system may alert him to the missing wallet as he is in the doorway.

At 606, data indicative of when each of the RFID tags is in communication with the RFID reader may be stored. A time may be associated with each of the RFID tags and the indication of whether each is in communication with the RFID reader. The time and the indication may be stored. The stored data may include a historic record of RFID tags and a history of their presence and/or absence relative to the RFID reader. The historic record may be stored as a list data structure. Recent updates may be appended to the stored data. The stored data may be structured according to a defined configuration setting that sets the volume of data to be stored. Thus, the stored data structure may operate as a first-in-first-out (FIFO) data structure.

At 608, the historical log of data from the RFID reader may be correlated with information from a personal information management module. For example, the RFID reader may store whether or not each RFID tag is a communication with the RFID reader as a function of time and date. This historical log may provide a tracking record of the relative location of the personal objects affixed to the various RFID tags. This historical log may be stored locally at a mobile telephone, at the RFID reader itself, or add a suitable position place in a wireless network. For example, the historical log may be stored at a service control point (SCP) in the wireless network. The historical log may be correlated with information from a personal information manager module. The personal information management module may store appointment calendar data associated with the user. For example, the personal information management module may include desktop software that the user uses to maintain calendar information. The personal information manager module may include software on the mobile telephone itself for calendar data. The personal information management module may include a web application at which the user stores calendar information. This personal information management module information may be correlated at the mobile telephone itself. Alternatively, the personal information management module information may be correlated with the historical log at a location in the wireless network and the results may be communicated to the mobile telephone.

Once this information is correlated, at 610, the information from the personal information management module that is associated with a time that an RFID tag was last in communication with the RFID reader may be displayed to the user. To illustrate, the historical log may indicate that the last time that an RFID tag associated with a lost wallet was in communication with the RFID reader was at 9 a.m. in the morning. The personal information management module may include a calendar entry at 9 a.m. The calendar entry may indicate that the user was on a flight at 9 a.m. The calendar entry may be displayed to the user. Because this event was closest in time to the last time that the RFID tag was scanned, the user may determine that the personal object was lost at or around that time and/or event. While the user may remember having the wallet the evening before, the scan and correlated calendar entry indicates that the wallet was with the user up until the flight. This information may jog the user's memory. Thus, the user may have an easier time finding the lost personal item.

What is claimed:

1. A device comprising: a processor; and memory coupled to the processor, the memory comprising executable instructions that when executed by the processor cause the processor to effectuate operations comprising: receiving an indication of a communication status between a radio frequency identification (RFD) tag and an RFID reader, the RFD tag being associated with an object;

generating a historical log of times associated with communications between the RFID tag and the RFID reader;

identifying an appointment of a plurality of appointments, the appointment having a timeframe closest to a last time that the RFID tag was in communication with the RFID reader than another of the plurality of appointments by correlating the last time with a digital calendar of the plurality of the appointments associated with the device, based on at least the historical log; and displaying an iconic representation of the object and an indication of the communication status, wherein when the RFID tag is not in communication with the RFID reader, the indication of the communication status is additionally indicative of the appointment and the last time.

2. The device of claim 1, the operations further comprising:
   receiving an indication of a change in the communication status; and
   responsive to receiving the indication of the change in the communication status, displaying the iconic representation of the object and an indication of the change in the communication status.

3. The device of claim 1, the operations further comprising:
   receiving an indication of a change in the communication status; and
   responsive to receiving the indication of the change in the communication status, displaying:
      the iconic representation of the object;
      an indication of the change in the communication status; and
      an indication of a time associated with the change in communication status.

4. The device of claim 1, wherein identifying the appointment is further based on at least one of location information, e-commerce information, e-mail information, short message information, or voice call information.

5. The device of claim 1, wherein the device comprises the RFID reader.

6. The device of claim 1, the operations further comprising:
   generating an alert when the RFID tag is not in communication with the RFID reader.

7. The device of claim 1, wherein:
   the object comprises one of:
      a key;
      a purse;
      jewelry; or
      a medicine container; and
   the iconic representation of the object comprises an iconic representation, respectively, of:
      the key;
      the purse;
      the jewelry; or
      the medicine container.

8. A datastore comprising executable instructions that when executed by a processor cause the processor to effectuate operations comprising:
   receiving an indication of a communication status between a radio frequency identification (RFID) tag and an RFID reader, the RFID tag being associated with an object;

generating a historical log of times associated with communications between the RFID tag and the RFID reader; identifying an appointment of a plurality of appointments, the appointment having a timeframe closest to a last time that the RFID tag was in communication with the RFID reader than any other of the plurality of appointments by correlating the last time with a digital calendar of the plurality of the appointments associated with the device, based on at least the historical log; and displaying an iconic representation of the object and an indication of the communication status, wherein when the RFID tag is not in communication with the RFID reader, the indication of the communication status is additionally indicative of the appointment and the last time.

9. The datastore of claim 8, the operations further comprising:
receiving an indication of a change in the communication status; and
responsive to receiving the indication of the change in the communication status, displaying the iconic representation of the object and an indication of the updated communication status.

10. The datastore of claim 8, the operations further comprising:
receiving an indication of a change in the communication status; and
responsive to receiving the indication of the change in the communication status, displaying:
the iconic representation of the object;
an indication of the updated communication status; and
an indication of a time associated with the change in communication status.

11. The datastore of claim 8, wherein identifying the appointment is further based on at least one of location information, e-commerce information, e-mail information, short message information, or voice call information.

12. The datastore of claim 8, wherein the device comprises the RFID reader.

13. The datastore of claim 8, the operations further comprising: generating an alert when at RFID tag is not in communication with the RFID reader.

14. The datastore of claim 8, wherein:
the object comprises one of:
a key;
a purse;
jewelry; or
a medicine container; and
the iconic representation of the object comprises an iconic representation, respectively, of:
the key;
the purse;
the jewelry; or
the medicine container.

15. A method comprising:
associating a device with a radio frequency identification (RFID) tag, the RFID tag being associated with an object;
receiving an indication of a communication status between the RFID tag and an RFID reader;
generating a historical log of times associated with communications between the RFID tag and the RFID reader;
identifying an appointment of a plurality of appointments, the appointment having a timeframe closest to a last time that the RFID tag was in communication with the RFID reader than any other of the plurality of appointments by correlating the last time with a digital calendar of the plurality of the appointments associated with the device, based on at least the historical log; and
displaying an iconic representation of the object and an indication of the communication status, wherein when the RFID tag is not in communication with the RFID reader, the indication of the communication status is additionally indicative of the appointment and the last time.

16. The method of claim 15, the operations further comprising:
receiving an indication of a change in the communication status; and
responsive to receiving the indication of the change in the communication status, displaying:
the iconic representation of the object;
an indication of the updated communication status; and
an indication of a time associated with the change in communication status.

17. The method of claim 15, wherein identifying the appointment is further based on at least one of location information, e-commerce information, e-mail information, short message information, or voice call information.

* * * * *